March 27, 1934.      E. O. BARSTOW ET AL      1,952,406
ABSTRACTING MOISTURE FROM AN AERIFORM BODY
Filed Jan. 20, 1932      4 Sheets-Sheet 1

INVENTORS
Edwin O. Barstow and
BY Sheldon B. Heath
Thomas Griswold, Jr.
ATTORNEY Patented Mar. 27, 1934

1,952,406

UNITED STATES PATENT OFFICE 1,952,406

ABSTRACTING MOISTURE FROM AN AERIFORM BODY

Edwin O. Barstow and Sheldon B. Heath, Midland, Mich., assignors to The Dow Chemical Company, Midland, Mich., a corporation of Michigan Application January 20, 1932, Serial No. 587,742

6 Claims. (Cl. 183—120)

Our present invention relates, as indicated, to the dehumidification of aeriform bodies, of which air is a specific example. It relates specifically to the dehumidification of the air in rooms, houses, shops, factories, theaters, and the like, or to the control of the relative humidity of air, etc.

Various methods and means have been proposed heretofore and some put into practice for the dehumidification of gases, such as air, or for the control of relative humidity for general and specific purposes. Among these proposals are those involving the removal of aeriform moisture by absorption in a moisture-abstracting agent, such as a hygroscopic chloride, lime, silica gel, glycerine, hygroscopic or deliquescent solids, hygroscopic liquids, and the like; removal of the moisture by condensation involving refrigeration; and the removal of moisture by condensation involving increase in pressure. Among the best worked out proposals are those employing artificial refrigeration which has so far found use in large installations where the high power cost involved was not a determining deterrent. The wide use, however, of dehumidification methods has so far been restricted to special cases where dehumidification is mandatory, or to instances in which advantages of such dehumidification are so great as to outweigh the cost thereof. It is highly desirable to reduce the cost of dehumidification in present and mandatory installations and still further desirable to simplify and cheapen the methods and means available to such an extent as to permit their use in homes generally.

We have invented methods directed to the solution of the problem by the use of which the operating cost in large installations is lowered, complexity greatly reduced, and the field for practicable application greatly extended, including homes generally, in which humidity control is highly desirable and heretofore impracticable because of high initial and/or high operating cost.

To the accomplishment of the foregoing and related ends, the invention, then, consists of the steps and means hereinafter fully described and particularly pointed out in the claims, the annexed drawings and the following description setting forth in detail certain means and modes for carrying out the invention, such disclosed means and modes illustrating, however, but several of various ways in which the principle of the invention may be used.

Figure 3:
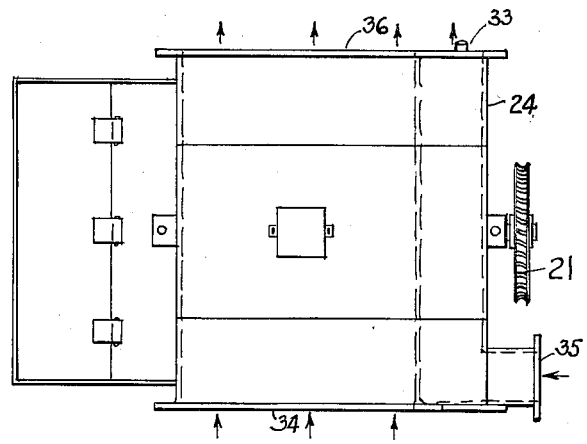
Figure 1:
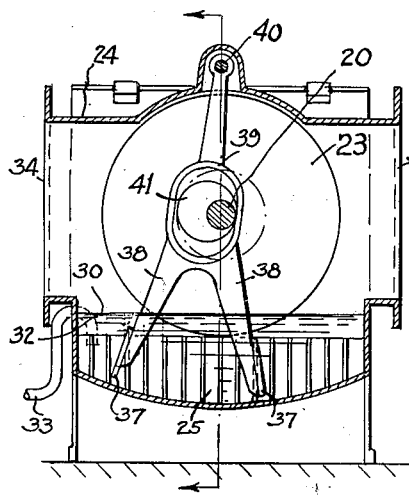
Figure 2:
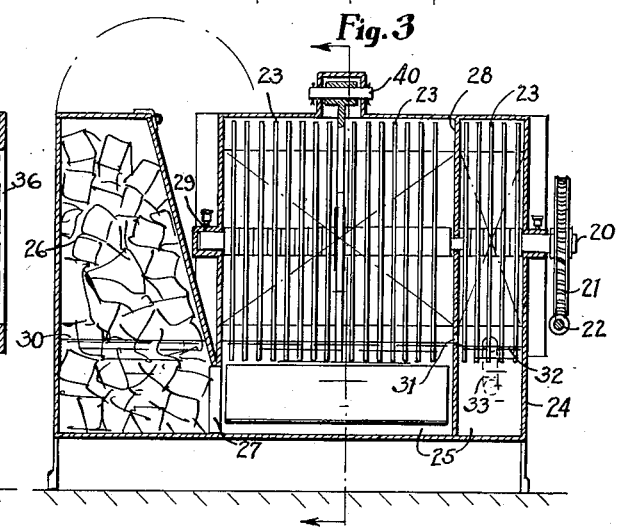
Figure 6:
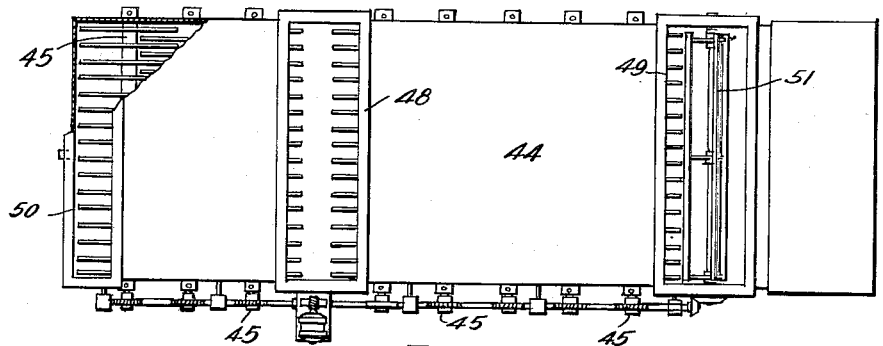
Figure 4:
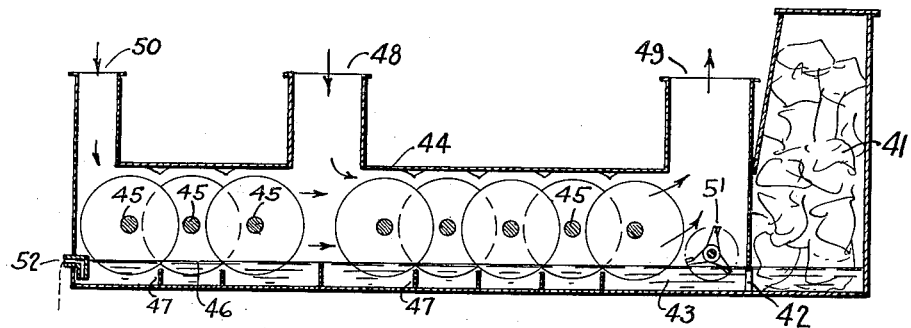
Figure 5:
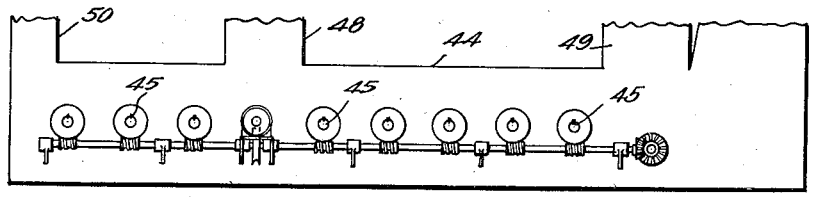
Figure 7:
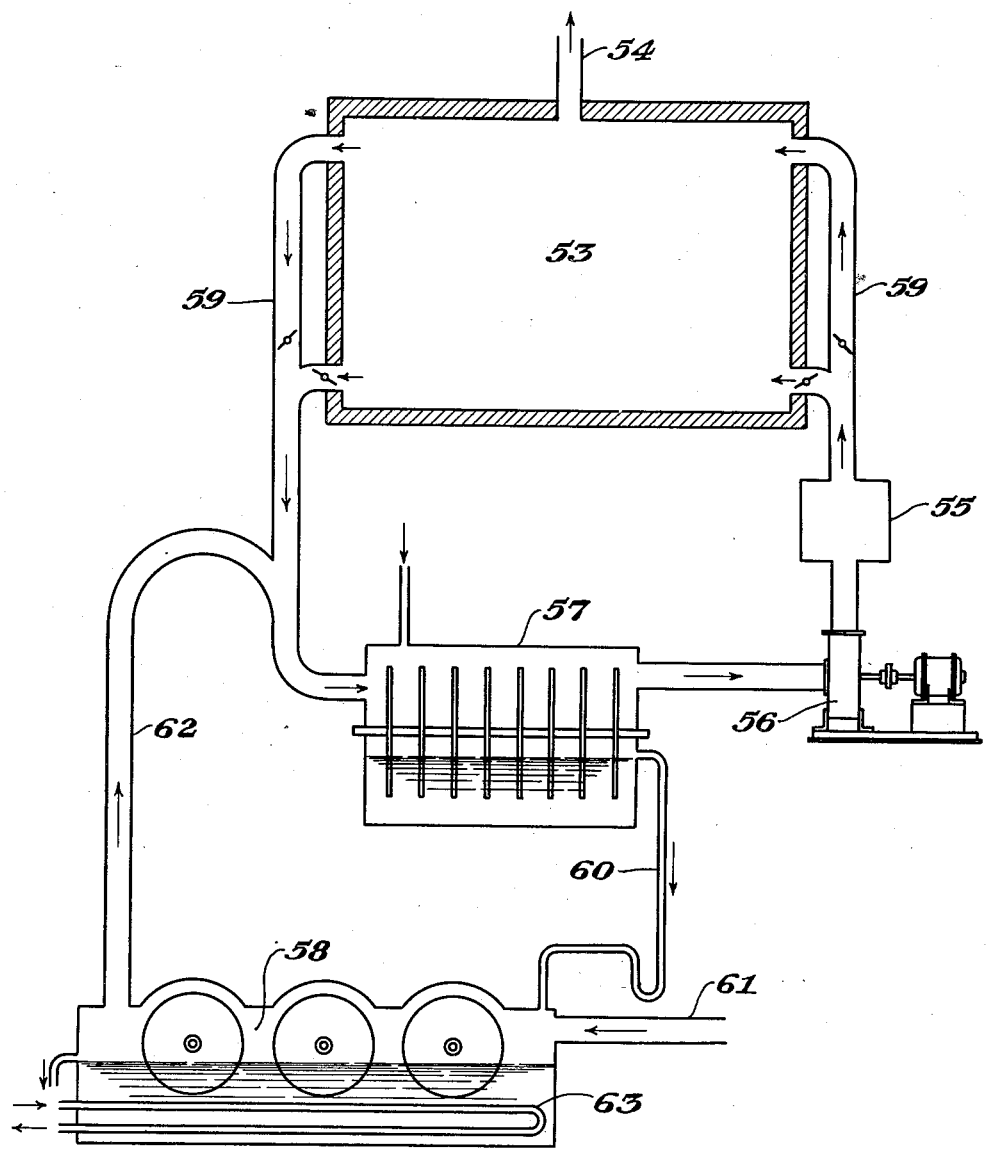
Figure 8:
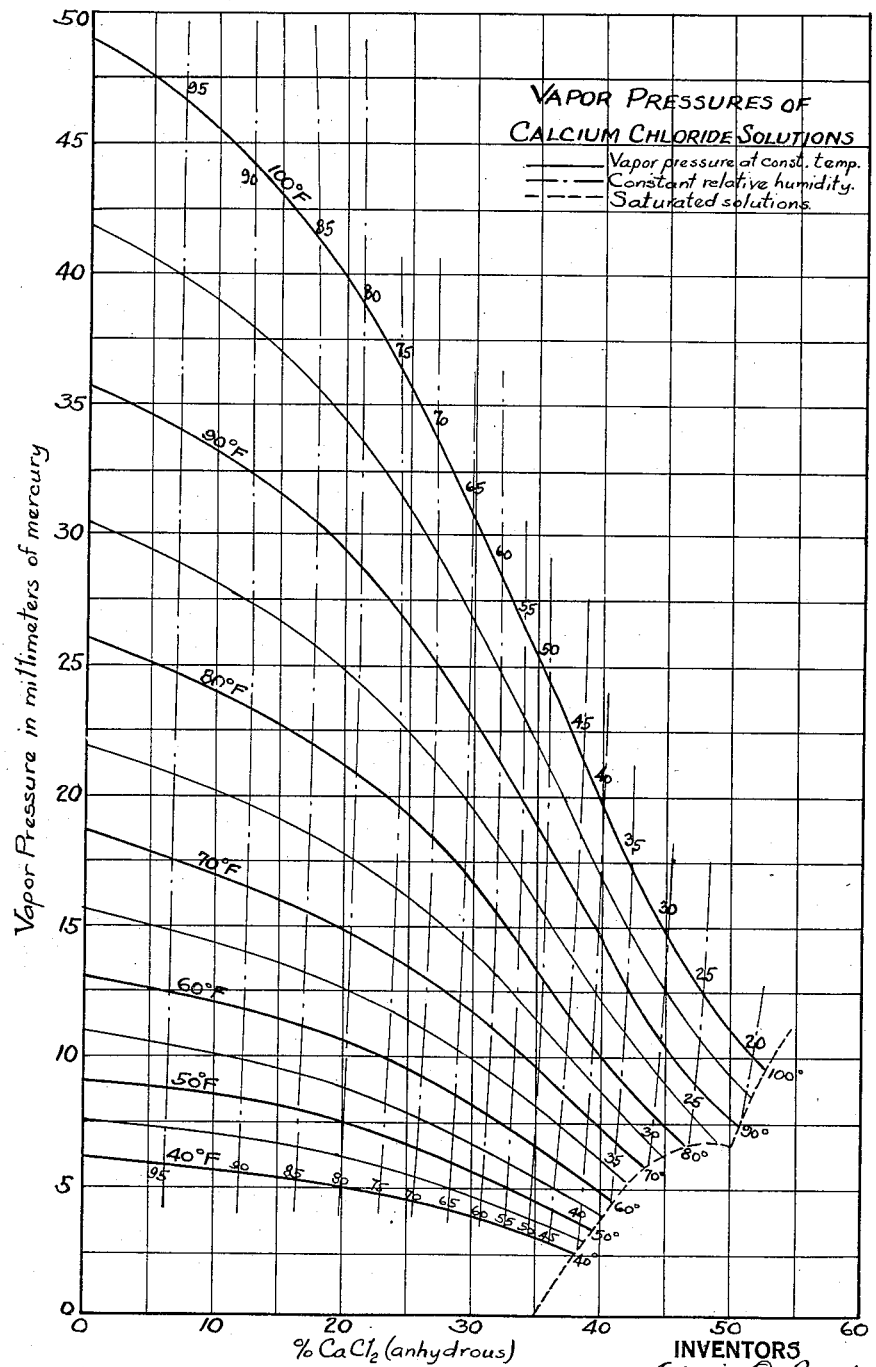

Figs. 1, 2, and 3 represent, respectively, a transverse section, a longitudinal section and a plan of a dehumidification unit in which uncooled moving surfaces wet with a liquid moisture-abstracting agent are employed. Figs. 4, 5, and 6 represent, respectively, a longitudinal vertical section, a part side elevation and a part plan of another type of the dehumidification unit employing surfaces of the type illustrated in Figs. 1, 2, and 3. Fig. 7 is a diagrammatic representation of a dehumidification or humidity control system and Fig. 8 is a curve chart showing the vapor pressures of calcium chloride solutions of various concentrations at various temperatures.

There are many solid and liquid materials having a greater or less avidity for aeriform moisture and exhibiting concentration-temperature-equilibrium conditions in contact with a gas containing moisture. We may employ in our method and means any solid hygroscopic material which will form a water solution in contact with air in which air the vapor pressure is higher than that of the solution being formed or we may employ a liquid having hygroscopic properties, such as a solution of any of the above described solids, or we may employ liquids, such as glycerine, sulphuric acid, etc., which at certain concentrations will absorb aeriform moisture. However, inasmuch as calcium chloride is cheaply available in large quantities we prefer to employ same as the moisture-abstracting agent either in the solid form or as a water solution thereof. It is equally feasible to employ therefor magnesium chloride or mixtures of magnesium chloride and calcium chloride either as mechanical mixtures thereof, or as the double salts thereof. The hydrated double salts and, particularly, the hydrated calcium chloride analyzing approximately 75 to 80 per cent calcium chloride, have properties adapting them admirably to the use in hand. We will accordingly describe our invention employing as the moisture-abstracting agent calcium chloride or an aqueous solution thereof, it being understood that other hygroscopic salts and other materials of the class described heretofore may be substituted as equivalents therefor.

When air containing moisture is contacted with a calcium chloride solution there is a transfer of moisture from the air to the solution, if the water vapor pressure in the air is greater than the water vapor pressure of the solution at the temperature. This transfer of moisture (which is present in the air as vapor) to the calcium chloride solution (where it exists as a liquid) is accompanied by the evolution of heat equal to the heat of condensation of the water, plus the heat of dilution of the calcium chloride solution.

When moist air and calcium chloride therefor, are contacted in a closed system, moisture is absorbed by the calcium chloride with evolution of heat, and the temperatures of the air and calcium chloride rise until the water vapor pressures of the air and of the calcium chloride solution become equal. It is possible to get a greater removal of moisture from the air by a given amount of calcium chloride if the materials are cooled during the dehumidification process, and certain phases of our invention are concerned with methods of contacting air and a moisture-abstracting agent, e. g. a solution of calcium chloride, while removing heat, specifically by conducting the heat away from the solution by means of a cooling agent in contact therewith. We will accordingly first describe the invention and means to practice same employing such type of heat removal.

By referring to curve chart Fig. 8 it is seen that a 40 per cent calcium chloride solution is in approximate equilibrium with 40 per cent relative humidity air at all temperatures between 60° and 100° F. The numerals from 20 to 95, inclusive, found on the top curved line of the figure indicate per cent relative humidity. The lower the temperature, however, at which we have 40 per cent relative humidity, the drier the air will be; hence, the value of keeping the calcium chloride solution cool is readily appreciated. On this curve chart we also see that 30 per cent calcium chloride solution has substantially the same vapor pressure at 70° F. that a 40 per cent calcium chloride solution has at 85° F., which shows how cooling enables the use of a weaker solution to effect the same relative humidity as that effected at a higher temperature by a stronger solution.

Figs. 1, 2, and 3 show, respectively, in transverse vertical cross section, longitudinal vertical cross section and plan a form of unit in which air may be contacted with a solution of calcium chloride distributed upon a plurality of rotating disk-like elements comprising in the aggregate a considerable contact area in a compact arrangement. A shaft 20 carrying a worm-wheel 21 driven by a worm 22 has mounted thereupon a plurality of disk-like elements 23 within a casing 24, the bottom of which forms a cistern 25. A magazine 26 for solid calcium chloride connects at its base by a grating 27 with the cistern 25. The cistern and that part of the casing containing the rotating elements is divided into two portions by the transverse partition 28 through which the shaft passes to a journal 29 at the end opposite the drive. As here drawn, there are five disk-like elements in the right-hand cistern in Fig. 2 and fifteen thereof in the left-hand cistern. The level of the solution in the large cistern is at 30, at which level it overflows through the opening 31 into the small cistern, attaining a level 32 therein, at which level it leaves the unit via the overflow 33. As here illustrated, recirculated air enters the large compartment at the opening 34 and make-up air enters the small compartment at opening 35, the two air currents leaving at the large opening 36 on the opposite side of the unit. Such air in its transit through the unit passes between the disk-like rotating elements 23 contacting thereon with the solution which is picked up by these rotating elements as they rotate partially submerged in the solution in the cistern, the solution being spread by gravity and capillarity as a film over the area represented by the two sides of the disks. Such disks may be advantageously constructed of muslin, canvas, or the like, carried upon a spider composed of a rim with spokes centering in a hub mounted upon the axle or shaft. If desirable, an agitator may be included in the solution. One is here shown comprising two stirring blades 37 mounted upon the forks 38 of a yoke 39 journaled upon a pin 40 in the cover of the casing. An eccentric 41 mounted upon the shaft is straddled by the yoke and upon rotation of the shaft causes the paddles 37 to be oscillated to and fro in the solution to stir same, which action facilitates the maintenance in the large cistern of a strong solution of calcium chloride derived from the solid calcium chloride in the magazine 30. The unit may or may not be divided into compartments, as here illustrated, or it may be divided into several such compartments when it is desired to contact the air successively in countercurrent with stronger and stronger solutions of calcium chloride. Such action may be attained by dividing the unit into a suitable number of compartments in each of which are mounted a suitable number of rotating disks, the casing having intercommunicating ducts to permit the circulation of the air through the compartments in series, whereas the solution introduced into the cistern adjacent the magazine will be permitted to flow therefrom through a suitable opening into the next cistern and from that to the following one. In each such cistern it will become diluted with moisture absorbed by the air and will finally issue as a weak solution, permitting highly economical use of the calcium chloride. By passing the make-up air through the final compartment in which the weakest solution is employed still further economy is attained.

In Figs. 4, 5, and 6 we illustrate a modification of the means illustrated in Figs. 1 to 3, inclusive, in which a series of shafts carrying disks are mounted side by side with the disks in overlapping relation to enable a large amount of contact surface to be secured in a small compact unit. Fig. 4 is a vertical longitudinal cross section. Fig. 5 is a part side elevation and Fig. 6 a part plan of the unit.

In this form of unit a magazine 41 suitable to receive intermittently a supply of calcium chloride in solid form communicates at its base through an opening 42 with a cistern 43 in the base of a casing 44 in which a plurality of shafts 45 are mounted transversely thereof, each said shaft carrying a plurality of disks of the character hereinbefore described, said disks dipping into solution in the cistern which is here shown at the level 46 therein. The cistern may be, moreover, divided by transverse baffles or dams 47 into a series of compartments. The unit here shown is adapted to the recirculation of a body of air and the introduction of make-up air in contact with spent solution. The main recirculatory flow is introduced through the opening 48 and leaves together with make-up air through the opening 49. Make-up air is introduced at the opening 50 contacting in the casing with the rotating disk-like elements in the left-hand end thereof to give up its moisture to the solution thereon, joining then the main flow and traveling therewith over the remaining contact surface to finally emerge therefrom at 49. A stirring paddle 51 may be introduced, if desired, to assist in getting the solid calcium chloride into solution and the level of solution in the cistern is maintained by the overflow 52 for spent solution.

With reference to the moving type of contact surface described heretofore and illustrated in Figs. 1 to 6, inclusive, we wish to point out that not only may rotatable surfaces such as described be used, but such surfaces may have a reciprocating motion. In either case whether rotating or reciprocating, it is to be noted that no pumping of solution is required, that the rotating surfaces may be turned slowly, requiring a very small amount of power even in a considerable installation, that reciprocating motion may be applied intermittently either to all of the surfaces involved or to portions thereof in succession, whereby fresh solution may be spread upon such surfaces which will then be exposed to the air current upon lifting out of the solution, it being necessary only that the reciprocating motion shall immerse the surface and lift it again into the air current. Such forms of units have advantages in both large and small size installatons since very simple mechanical arrangements can be employed, pumping devices being entirely dispensed with and the power consumption in operation being cut to a very small amount.

We have described our invention so far with reference to its use for dehumidification of air. Such invention is applicable, however, to the like treatment of any gaseous medium and such treatment is within the limits of our invention. The invention is further applicable as a portion of a general air conditioning system and we show in Fig. 7 a diagrammatic layout from which the general application of our invention to air conditioning may be understood. In such figure, 53 represents a body of air to be treated, such as that in a house or the like, which body of air is subject to leakage as represented by the vent 54. 55 represents any air conditioning unit for heating, cooling, washing, sterilizing, filtering or other treatment of the air. 56 represents a circulating fan. 57 and 58 represent in general dehumidification or relative humidity control units. 53, 55, 56, and 57 are connected together by the ducts 59 into a closed system through which the air in 53 is recirculated in the direction of the arrows. The valved conduit connections to 53 indicate that the circulation may enter or leave any part of the house or equivalent. The unit 57 may embody any form of dehumidifier hereinbefore described. It may be single-pass as to the air or contain a number of passes. It may be operated in parallel or countercurrent relation between air and moisture-abstracting agent, but, in all cases, spent solution from 57 will be employed in unit 58, wherein it is cooled by indirect contact with a cooling liquid circulating through the coil 63, passing to unit 58 via the duct 60 in which unit 58 make-up air entering at 61 will be treated with such spent solution and from thence drawn into the main circuit through the duct 62. Again, the unit 58 may embody any of the features herein disclosed and may be in single or multiple countercurrent or parallel current or other arrangement. Further, the spent solution from 58 may be reconcentrated and the concentrated solution or the solid derived therefrom may be returned to 57 for reuse. The initial abstracting agent employed in 57 may be a solid or a liquid and insofar as the general principles illustrated in Fig. 7 are concerned, heat may be abstracted from the solution at the contact surface with the air or the air may be cooled, or, again, a solution may be cooled in the cistern before distribution upon contact surface. Furthermore, the water content of the spent solution may be in part removed by evaporation or by addition of solid or strong solution be brought up to the strength required in the remaining portions of the system.

Having now described our invention and various means adapted to carry it out, it is obvious that although we have described its use employing a solution of calcium chloride or solid calcium chloride, the invention is not restricted, as hereinbefore pointed out, to the use of any one moisture-abstracting agent. It will be noted, further, that the introduction of solid calcium chloride may be made without the risk of incurring the suspension of dust or solid particles of calcium chloride in the air stream, a contingency which must be avoided in practical applications. We also point out that in those modes and means hereinbefore described in which the calcium chloride solution is passed in countercurrent contact with the air not only will the economic use of the moisture-abstracting agent be secured but the final effluent will normally be so weak that stoppage troubles occurring with temperature change in strong solutions due to solidification will be avoided. We further point out that in employing magazines in which calcium chloride may be introduced in considerable quantity it is possible to use any of the commercial forms of this highly effective agent and it is possible further to extend the magazine charging opening through a building wall to the outside thereof to permit the introduction of the chloride into the system from without, which procedure has very obvious advantages. It will be noted that in all of the means herein disclosed care has been taken to spread the moisture-abstracting agent upon surfaces so arranged that, while affording large surface contact area for the air, a minimum air resistance is interposed which is an important consideration from the operating power cost standpoint. We point out still further that any of the units herein disclosed may be employed in multiple or series both as to air flow and solution flow.

Other modes of applying the principle of our invention may be employed instead of the ones explained, change being made as regards the means and the steps herein disclosed, provided those stated by any of the following claims or their equivalent be employed.

We therefore particularly point out and distinctly claim as our invention:—

1. In a method of the character described, wherein a body of moisture-containing air subject to loss is recirculated to contact with a moisture-abstracting agent to abstract moisture from said air, and make-up air is admitted to offset said loss, the step which consists in passing said make-up air in contact with said moisture-abstracting agent after use thereof in contact with said recirculated air.

2. In a method of the character described, wherein a body of moisture-containing air subject to loss is recirculated to contact with a moisture-abstracting agent to abstract moisture from said air, and make-up air is admitted to offset said loss, the step which consists in passing said make-up air in contact with aqueous calcium chloride solution after use thereof in contact with said recirculated air while abstracting heat from said solution by conduction.

3. In a method of the character described, wherein a body of moist air subject to loss is recirculated to contact with a dehumidifying agent, and make-up air is admitted to offset such loss, the step which consists in passing such make-up air in contact with an aqueous calcium chloride solution after use thereof in contact with said recirculated air.

4. In a method of conditioning air, the steps which consist in passing an aqueous solution of a moisture-absorbing agent in direct contact with, and in countercurrent relation to, a recirculated current of air and then similarly contacting the solution with a current of make-up air which is to be mixed with said recirculated current.

5. In a method of conditioning air, the steps which consist in passing an aqueous calcium chloride solution in direct contact with, and in countercurrent relation to, a recirculated current of air and then similarly contacting the solution with a current of make-up air which is to be mixed with said recirculated current.

6. In a method of conditioning air, the steps which consist in passing an aqueous calcium chloride solution in direct contact with, and in countercurrent relation to, a recirculated current of air and then similarly contacting the solution with a current of make-up air which is to be mixed with said recirculated current, while contacting said solution in said first step with a body of solid calcium chloride to maintain the strength of the solution, such body of calcium chloride being excluded from contact with said air current.

EDWIN O. BARSTOW.
SHELDON B. HEATH.